(12) United States Patent
Hansen et al.

(10) Patent No.: US 10,384,917 B2
(45) Date of Patent: Aug. 20, 2019

(54) APPARATUS AND METHOD FOR REMOVING EQUIPMENT PARTS FROM A PLATFORM OF A WIND TURBINE GENERATOR, AND METHOD FOR FILLING A FUEL TANK ON SAID PLATFORM

(71) Applicant: MHI Vestas Offshore Wind A/S, Aarhus N (DK)

(72) Inventors: Morten Frost Hansen, Langå (DK); Peter Nordlyng, Hobro (DK); Mark Ursell-Smith, Ebeltoft (DK); Kim Christensen, Randers Nv (DK); Ken Nakayama, Højbjerg (DK)

(73) Assignee: MHI Vestas Offshore Wind A/S, Aarhus N (DK)

( * ) Notice: Subject to any disclaimer, the term of this patent is extended or adjusted under 35 U.S.C. 154(b) by 0 days.

(21) Appl. No.: 15/515,813

(22) PCT Filed: Sep. 16, 2015

(86) PCT No.: PCT/DK2015/050278
§ 371 (c)(1),
(2) Date: Mar. 30, 2017

(87) PCT Pub. No.: WO2016/055068
PCT Pub. Date: Apr. 14, 2016

(65) Prior Publication Data
US 2017/0240393 A1    Aug. 24, 2017

(30) Foreign Application Priority Data
Oct. 7, 2014  (DK) .................................. 2014 70621

(51) Int. Cl.
B66C 23/16    (2006.01)
B66D 3/00     (2006.01)
(Continued)

(52) U.S. Cl.
CPC ............ *B66D 3/006* (2013.01); *B60P 1/6427* (2013.01); *B63B 27/32* (2013.01); *B65G 67/24* (2013.01);
(Continued)

(58) Field of Classification Search
CPC .. B29C 45/1756; B60P 1/6427; B60P 1/6436; B30B 15/028; B65G 67/20;
(Continued)

(56) References Cited

U.S. PATENT DOCUMENTS 1,883,538 A * 10/1932 Bywater ............... B60P 1/6436
                                                280/107
1,921,605 A *  8/1933 Canfield ................ B65G 67/02
                                                410/66

(Continued)

FOREIGN PATENT DOCUMENTS

CN        102734074 A    10/2012
EP         2520533 A1    11/2012
(Continued)

OTHER PUBLICATIONS

Danish Patent and Trademark Office, Search Report in PA 2014 70621 dated Jun. 4, 2015.
(Continued)

*Primary Examiner* — Gregory W Adams
(74) *Attorney, Agent, or Firm* — Wood Herron & Evans LLP

(57) ABSTRACT

A power pack [2] is located within a housing [3] on the platform [1] of a wind turbine generator tower. The power pack [2] is supplied from a fuel tank [4]. With the door [6] of the housing [3] open, the power pack [2] may be removed for servicing and repair by using a U-shaped support structure [8] to which an electric motor [11] is mounted. Two support rails [12] permanently located within the housing [3]

(Continued)

support the housed power pack [2]. A chain [15] attached to the power pack [2] is driven by the motor [11] to remove the power pack [2] from the housing [3] by sliding the power pack [2]along the support structure [8]. A pulley arrangement reduces the necessary torque. After removing the power pack [2] from the housing [3], a crane [7] is used to lift the power pack [2] from the platform [1] and to lower it down to a sea vessel [17]. The crane [7] may also be used in the refilling of the fuel tank [4] by hauling a fuel line [18] from a sea vessel up to the platform [1] and connecting it to the fuel tank [4].

13 Claims, 4 Drawing Sheets

(51) Int. Cl.
    B65G 67/24    (2006.01)
    B60P 1/64     (2006.01)
    B63B 27/32    (2006.01)
    B66D 3/02     (2006.01)
    B67D 9/00     (2010.01)
    F03D 80/50    (2016.01)
(52) U.S. Cl.
    CPC ............... B66D 3/02 (2013.01); B67D 9/00
        (2013.01); F03D 80/50 (2016.05); F05B
        2240/916 (2013.01)
(58) Field of Classification Search
    CPC ..... B65G 1/0435; B65G 67/24; Y02E 10/728;
        Y02P 70/523; B66C 23/207; B65B 27/12
    See application file for complete search history.

(56) References Cited

U.S. PATENT DOCUMENTS

| | | | | |
|---|---|---|---|---|
| 1,933,211 A * | 10/1933 | Flowers | ................ | B60P 1/6427 414/343 |
| 2,127,058 A * | 8/1938 | Fitch | .................... | B60P 1/6427 414/343 |
| 2,150,371 A * | 3/1939 | Furnish | ................ | B60P 1/6436 292/25 |
| 2,304,115 A * | 12/1942 | Norbom | ................ | B60P 1/6436 14/71.1 |
| 2,346,605 A * | 4/1944 | Proudfoot | ............. | B61D 47/00 414/538 |
| 2,808,289 A * | 10/1957 | Scoby | ................... | B60P 1/6436 410/80 |
| 2,865,518 A * | 12/1958 | Matheisel | ............... | B64C 39/00 414/137.2 |
| 3,028,023 A * | 4/1962 | Eckersall | ............. | B60P 1/6427 105/455 |
| 3,103,395 A | 9/1963 | Winberg | | |
| 3,122,244 A * | 2/1964 | Corso | .................... | B25B 11/00 104/34 |
| 3,147,868 A * | 9/1964 | Borger | ................... | B60P 1/6427 414/343 |
| 3,186,566 A * | 6/1965 | Spinanger | ............. | B65G 67/20 280/24 |
| 3,189,199 A * | 6/1965 | Eaton | .................... | B60P 1/6427 14/71.1 |
| 3,811,579 A * | 5/1974 | Black | .................... | B65G 67/02 414/347 |
| 3,829,064 A | 8/1974 | Jackson | | |
| 4,101,038 A * | 7/1978 | Palma | .................... | B65G 67/24 104/34 |
| 4,120,411 A * | 10/1978 | Johnson | .................... | B62B 3/10 104/235 |
| 4,283,164 A * | 8/1981 | Reaney | .................... | B60K 1/04 104/34 |
| 4,457,424 A * | 7/1984 | Wuensch | ............... | B65G 67/24 108/53.1 |
| 4,555,228 A * | 11/1985 | Nishiike | ............... | B29C 31/006 425/185 |
| 4,597,709 A * | 7/1986 | Yonezawa | .............. | B21D 37/14 104/307 |
| 4,609,313 A * | 9/1986 | Oshino | .................. | B60R 16/02 16/348 |
| 4,705,445 A * | 11/1987 | Morita | ................ | B29C 45/1756 104/162 |
| 4,737,095 A * | 4/1988 | Hehl | ................... | B29C 45/0084 414/744.2 |
| 4,749,325 A * | 6/1988 | Hodgetts | ................ | B65G 67/20 242/919 |
| 5,063,648 A * | 11/1991 | Yonezawa | ............. | B23Q 3/1556 100/918 |
| 5,186,596 A * | 2/1993 | Boucher | ................ | B65G 67/20 198/303 |
| 5,236,297 A * | 8/1993 | Gombos | ............... | A01F 15/005 414/343 |
| 5,364,226 A * | 11/1994 | Gombos | ............... | A01F 15/005 414/343 |
| 5,364,328 A * | 11/1994 | Takahama | ........... | B29C 45/1756 100/224 |
| 5,570,988 A * | 11/1996 | Gallaway | .............. | B62B 5/0003 414/343 |
| 6,354,787 B1 | 3/2002 | O'Daniel | | |
| 6,450,753 B1 * | 9/2002 | Hallstrom | ............ | B65G 25/065 414/396 |
| 6,490,906 B1 | 12/2002 | Bailey | | |
| 6,827,032 B1 * | 12/2004 | Wobben | .................. | B63B 22/02 114/230.1 |
| 6,935,390 B2 * | 8/2005 | Williamson | ............ | B63B 27/24 114/230.1 |
| 8,105,006 B2 * | 1/2012 | Brewer, III | ........ | G03G 15/6552 280/33.997 |
| 9,030,035 B2 | 5/2015 | Tripathi et al. | | |
| 2004/0011562 A1 | 1/2004 | Simpson et al. | | |
| 2007/0199387 A1 | 8/2007 | Asher | | |
| 2012/0257973 A1 * | 10/2012 | Rebsdorf | ................ | F03D 11/04 416/146 R |
| 2013/0011196 A1 * | 1/2013 | Brenner | .................... | F41F 3/08 405/1 |
| 2013/0089405 A1 * | 4/2013 | Wigant | .................... | B66C 23/04 414/803 |
| 2013/0154262 A1 * | 6/2013 | Tripathi | .................. | F03D 7/026 290/44 |
| 2013/0175801 A1 * | 7/2013 | Matzen | ................. | F03D 7/0284 290/44 |

FOREIGN PATENT DOCUMENTS

| | | | | |
|---|---|---|---|---|
| EP | 2551233 A1 * | 1/2013 | ............ | B66C 13/02 |
| EP | 2786953 A1 | 10/2014 | | |
| WO | 0076889 A1 | 12/2000 | | |
| WO | 2012098384 A1 | 7/2012 | | |
| WO | WO-2012098384 A1 * | 7/2012 | ........... | B66C 23/207 |

OTHER PUBLICATIONS

European Patent Office, International Search Report and Written Opinion in PCT Application Serial No. PCT/DK2015/050278, dated Dec. 14, 2015.

The State Intellectual Property Office of China, First Notification of Office Action in CN Application No. 201580060067.7, dated Jun. 5, 2018.

China National Intellectual Property Administration, 2nd Notification of Office Action in CN Application No. 201580060067.7, dated Apr. 1, 2019.

* cited by examiner

APPARATUS AND METHOD FOR REMOVING EQUIPMENT PARTS FROM A PLATFORM OF A WIND TURBINE GENERATOR, AND METHOD FOR FILLING A FUEL TANK ON SAID PLATFORM

The present invention relates to apparatus which can be used on the tower platform of a wind turbine generator.

Wind turbine generators convert energy from wind into electricity which may be supplied to the mains electricity grid. Each generator requires a supply of power for auxiliary equipment such as safety systems, and this is usually supplied from a rechargeable battery which is recharged by a battery charger using power from either the output of the wind turbine generator itself or from the mains grid.

Wind turbine generators are often equipped with a fossil-fuelled power pack, such as a diesel generator, fuel cell or similar kind of fossil-fuel generator for supplying power to the auxiliary equipment and/or the battery charger when there is no wind and/or in the event of the wind turbine generator becoming disconnected from the mains grid.

When a power pack is used, a separate tank for the fossil fuel is also required.

The present invention seeks to provide arrangements for removing power packs from the platform for servicing and repair, and also for replenishing the fuel tank.

The present invention finds particular application to wind turbine generators which are located offshore, in which case the power packs will typically be transported by a sea vessel to an onshore location for servicing and repair, and for which fuel will typically be transferred from a sea vessel to the fuel tank.

In accordance with a first aspect of the present invention there is provided apparatus for removing equipment from a housing on a platform of a wind turbine generator, the apparatus comprising: a winch for withdrawing the equipment from the housing in a substantially horizontal direction; and a portable support structure arranged to support the equipment during its removal from the housing.

The term, "winch" is intended to mean any device, whether electrically-driven or manually operated, which enables the equipment to be withdrawn horizontally from the housing. For example, this could be in the form of an electric motor or a pneumatically operated ram mechanism.

By providing a support structure which is portable, the support structure can be readily transported between different wind turbine generators so as to enable equipment to be removed for maintenance or repair. In this way, a single support structure can be used to effect the removal of equipment from a number of different platforms. This contrasts with systems in which a support structure is formed integrally within a wind turbine generator, in which case a respective support structure must be provided for each generator.

The invention is particularly advantageous in arrangements where the configuration of the housing prevents the equipment from simply being lifted out of the housing, e.g. by using a crane. Thus, the invention may readily be applied to arrangements in which the housing comprises a substantially vertical door which can be opened both for access to the equipment and also to effect removal of the equipment using the above-defined apparatus.

The support structure is preferably arranged to be moved from an inoperative configuration into an operative configuration where it can support the equipment during removal.

The wording, "inoperative configuration" is intended to mean a configuration in which the part of the support structure cannot support the equipment for removal. Thus, when the support structure is in its inoperative configuration, it could be stored in the housing together with the equipment, or alternatively located outside the housing. In one arrangement, the support structure is normally located remote from the wind turbine generator, and is transported to the platform whenever removal of the equipment is required.

The winch is advantageously attached to the support structure, since this readily enables the equipment to be moved relative to the support structure.

There is preferably further provided a housing support arranged to support the equipment when in the housing.

In this case, the support structure, when in the operative configuration, may conveniently abut the housing support to provide a substantially continuous support surface. Removal of the equipment can then involve sliding the equipment on the resulting continuous support surface.

In the preferred embodiment, the apparatus comprises a tension line which, prior to removal of the equipment, is arranged to be connected to the equipment, the winch being arranged to drive the tension line thereby to draw the equipment from the housing.

In this case, the winch is preferably arranged to gather the tension line as the equipment is being drawn from the housing. The tension line may be gathered around a spool attached to the winch.

The apparatus preferably further comprises a pulley arrangement such that the length of tension line gathered by the winch is substantially greater than the distance by which the equipment is caused to move. This reduces the torque required by the winch to remove the equipment from the housing.

The length of tension line gathered by the winch is preferably an odd number of times the distance by which the equipment is caused to move, since this enables the pulley wheel or wheels to be attached to the equipment. In the preferred embodiment, the length of tension line gathered by the winch is three times this distance.

The tension line may be in the form of a chain.

In the preferred embodiment, the winch is an electric motor, although, as mentioned above, other arrangements, such as a manual handle-operated winch or a pneumatic ram could alternatively be used.

In the preferred embodiment, the support surface is generally U-shaped, the two legs of the U-shape forming a surface over which the equipment is arranged to slide, the winch being attached to the bar of the U-shape. When the housing support is provided, this part may be in the form of two rails which are arranged to abut the legs of the U-shape when the support surface is in its operative configuration.

The two legs of the U-shape are advantageously detachable from the bar of the U-shape, since this enables the support surface to be stored and transported in a compact configuration.

The apparatus may further comprise a crane mounted in use on the platform and arranged to lift the equipment after removal from the housing from the support structure and to lower the equipment on to an external surface. When the platform is located offshore, the external surface will typically be on a sea vessel for transporting the equipment to an onshore location for maintenance and/or repair.

The invention extends to a method of removing equipment from a housing on a platform of a wind turbine generator using any of the above-described apparatus.

The equipment may be a power pack. When the power pack requires a supply of fuel, there is preferably further provided on the platform a fuel tank for the power pack.

A method as claimed in any one of claims 14 to 16, when dependent on claim 13, wherein the wind turbine generator is located offshore, the method further comprising using the crane (7) to lift the equipment (2) after removal from the When the apparatus includes a crane, the method can be applied on an offshore wind turbine generator, in which case the crane may be used to lift the equipment after removal from the housing from the support structure and subsequently to lower the equipment on to a surface of a sea vessel.

The fuel tank will require refilling from time to time. Although this could be achieved by the provision of a permanent pipeline installed between the platform and an external fuel supply, it would be desirable to provide a more convenient means of refilling.

Thus, in accordance with a further aspect of the present invention there is provided a method of refilling a fuel tank on a platform of a wind turbine generator from an external fuel supply, in which a crane is arranged on the platform, the method comprising using the crane to lift a fuel supply pipeline from the external fuel supply to the platform and connecting the pipeline to the fuel tank.

In this way, there is no need for a permanent pipeline to the installed, and a single fuel supply pipeline from the external fuel supply can be used to refill fuel tanks on a number of different platforms.

The invention finds particular application where the wind turbine generator is located offshore, in which case the external fuel supply is on a seagoing vessel.

Preferred embodiments of the invention will now be described with reference to the accompanying drawings, in which.

Throughout the drawings, the same reference numbers are used to refer to the same elements.

Figure 1:
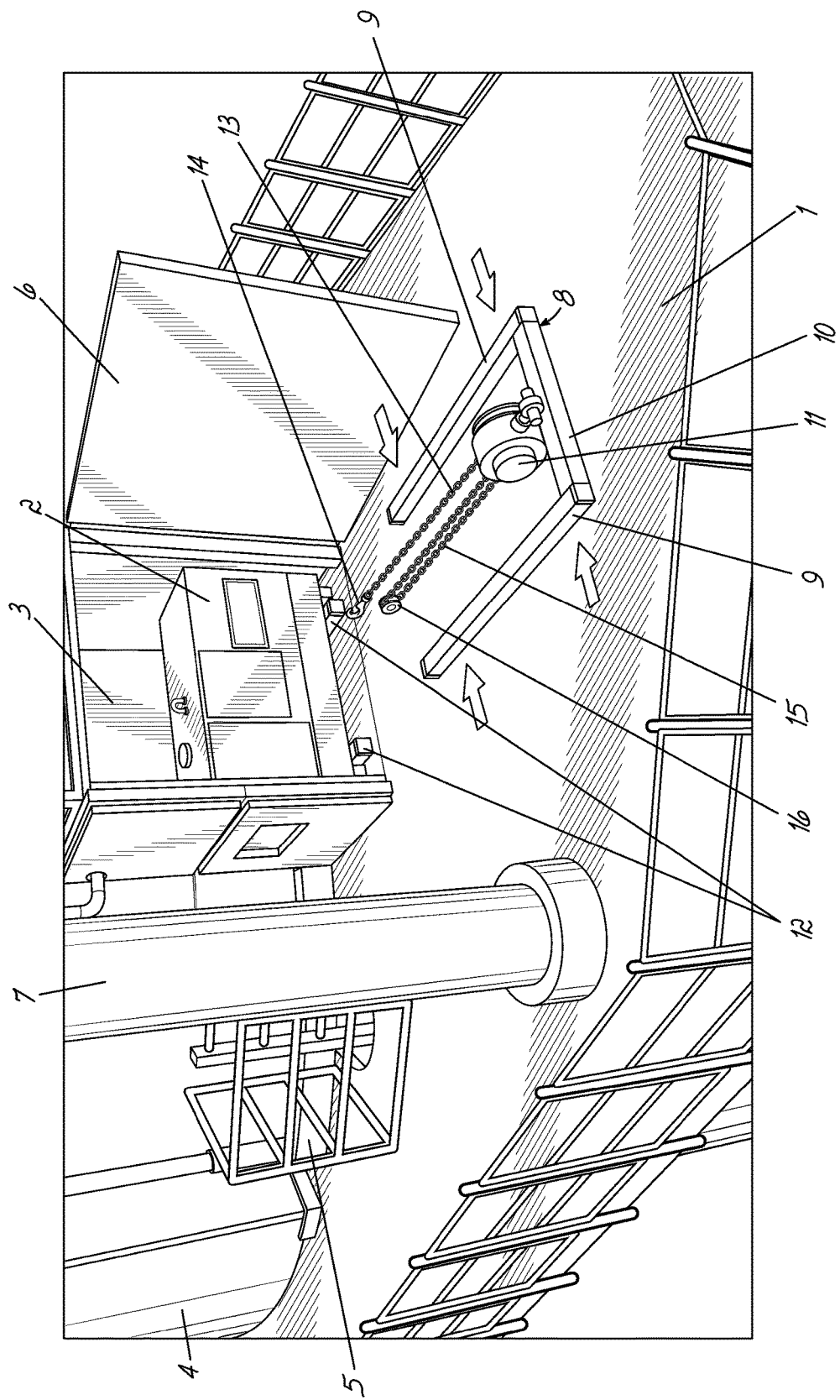
FIG. 1 illustrates apparatus in accordance with a first embodiment of the present invention in an inoperative configuration.
Figure 2:
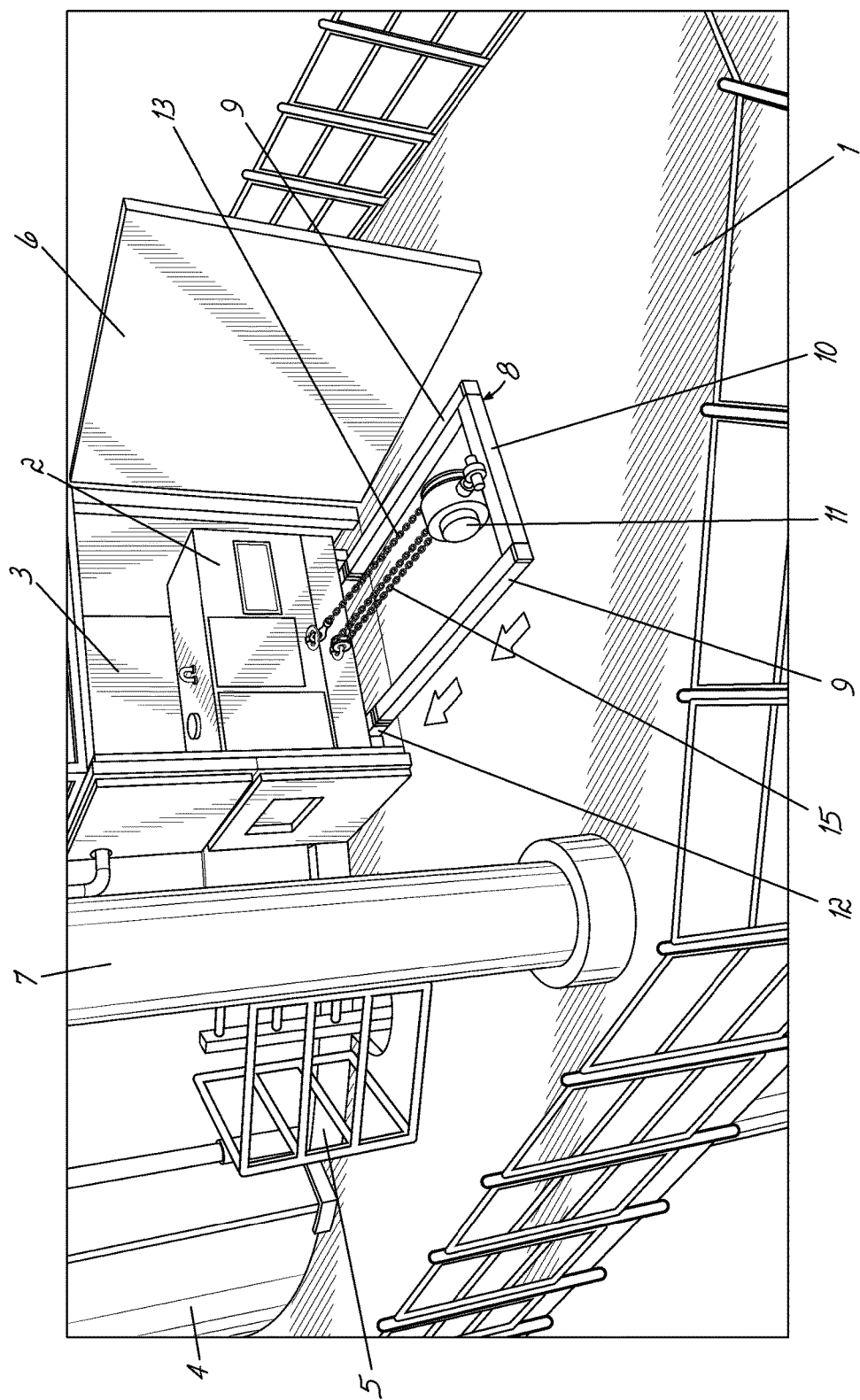
FIG. 2 illustrates the apparatus of FIG. 1 in its operative configuration.

Referring to FIGS. 1 and 2, a platform 1 is mounted to the tower of an offshore wind turbine generator (not shown). Also mounted to the tower are a power pack 2 within a housing 3 and fuel tank 4. The fuel tank 4 supplies diesel fuel to the power pack 2 along a fuel pipe 5. The housing 3 has a door 6 which may be opened by service personnel to perform servicing operations on the power pack 2.

A crane 7 is supported on the platform 1 to one side of the housing 3.

It is sometimes necessary for the power pack 2 to be removed from the housing 3 to enable more substantial servicing and repairs which cannot be performed in situ.

A U-shaped support structure 8 is used to facilitate removal of the power pack 2 from the housing 3. This is formed by engaging the ends of two elongate rails 9 into respective ends of a cross-bar 10 in the direction indicated by the arrows in FIG. 1. An electric motor 11 is mounted on the cross-bar 10.

Two further support rails 12 are permanently located within the housing 3 and are used to support the housed power pack 2. These further support rails 12 are spaced by the same distance, and have the same cross-sectional shape, as that of the two elongate rails 9 of the support structure 8. Thus, when the support structure 8 is brought into abutment with the two further support rails 12 by movement in the direction indicated by the arrows in FIG. 2, a continuous sliding surface is formed by the upper surfaces of the two elongate rails 9 and the further support rails 12.

A tension line in the form of a steel chain 13 is attached to the power pack 2 by means of a hook 14 mounted to one end of the chain 13. The chain 13 is driven by the motor 11 to effect removal of the power pack 2 from the housing 3.

A pulley arrangement is used to reduce the torque required by the motor to withdraw the power pack 2 from the housing 3. The pulley arrangement is in the form of a loop 15 of the chain 13 extending around a pulley 16 which, in use, is mounted to the power pack 2. In operation, the motor 11 gathers the chain 13 from the loop 15 and winds it on a spool (not shown). With this pulley arrangement, for each three units of length of the chain 13 gathered by the motor 11, the power pack 2 is drawn out of the housing 3 by a distance of one unit of length.

Figure 3:
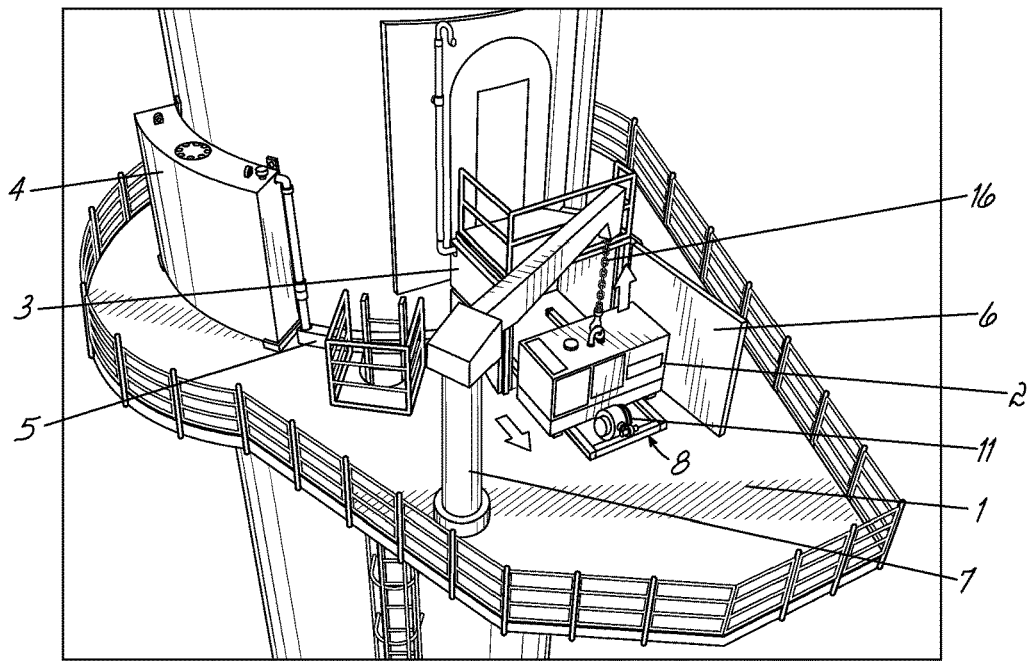
FIG. 3 illustrates the use of the apparatus of FIG. 1 to lift a power pack from a platform.

Referring to FIG. 3, after the power pack 2 has been fully withdrawn from the housing 3, a winching line 16 is lowered from the crane 7 and attached to a lug on the top of the power pack 2. The crane 7 then lifts the power pack 2 from the platform 1.

Figure 4:
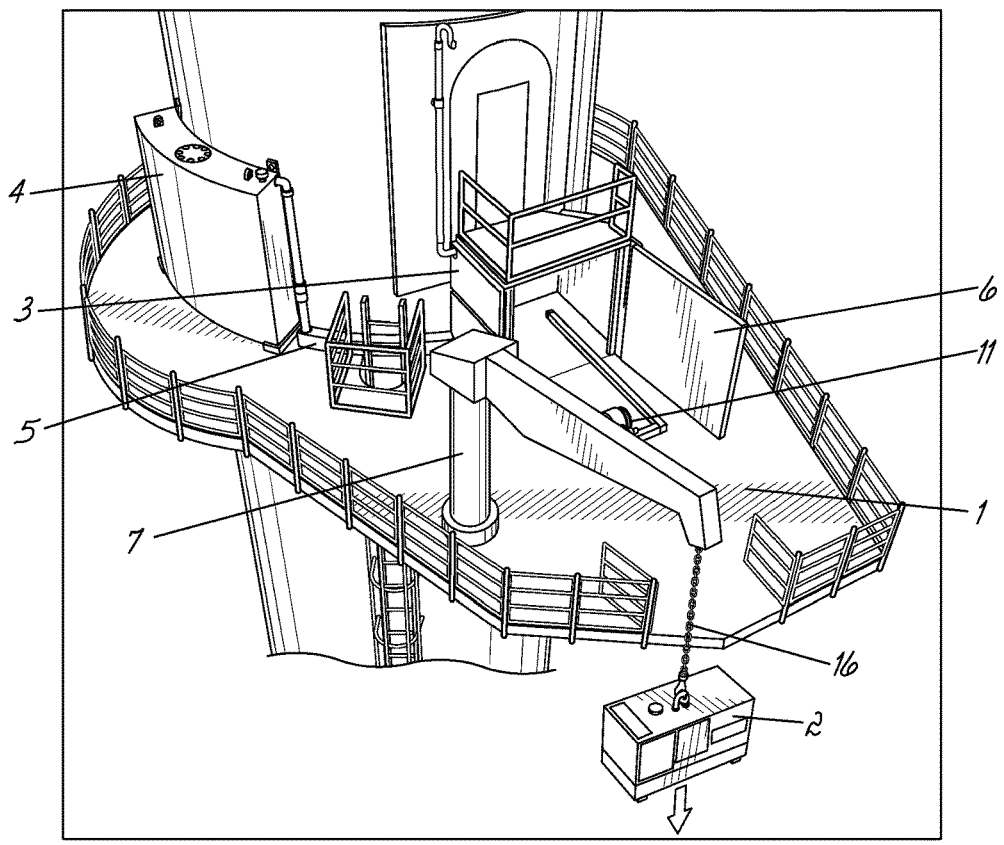
FIG. 4 illustrates the use of the apparatus of FIG. 1 to lower a power pack generator from a platform.

Referring to FIG. 4, the arm of the crane 7 is then rotated about a vertical axis to a position where it can lower the power pack 2 on to a suitable surface of sea vessel (not shown).

Referring to FIGS. 5(a) to 5(h), the crane 7 is also used to facilitate refilling of the diesel fuel tank 4. A sea vessel 17 containing a supply of diesel fuel arrives at a wind turbine tower which supports a platform 1 (FIG. 5(a)). Service personnel then climb up the tower using a ladder (FIG. 5(b)). A diesel fuel line 18 is then winched up to the platform 1 on the tower using the crane 7 (FIG. 5(c)). With the fuel line 18 in position (FIG. 5(d)), it is then attached to a diesel fuel tank 4 mounted on the side of the tower (FIG. 5(e)). The desired amount of diesel fuel is then supplied to the fuel tank 4 through the fuel line 18 (FIG. 5(f)).

Figure 5A:
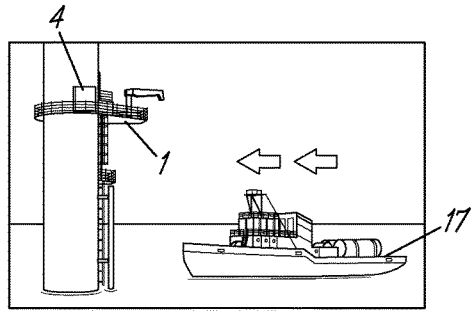
FIGS. 5(a) to 5(h) illustrate a method of refilling a fuel tank on a wind turbine generator tower platform in accordance with a further embodiment of the present invention.
Figure 5B:
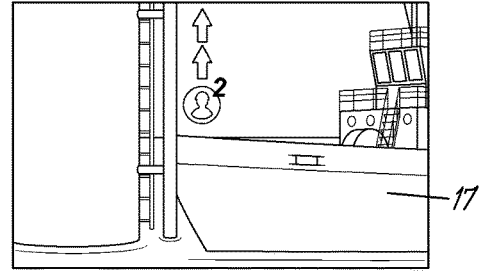
Figure 5C:
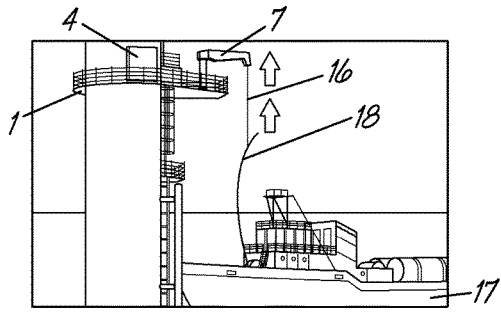
Figure 5D:
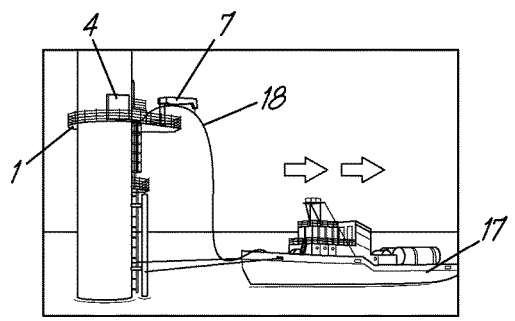
Figure 5E:
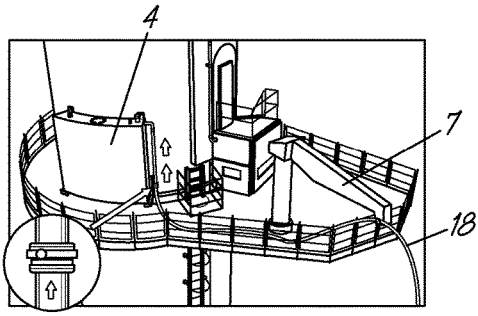
Figure 5F:
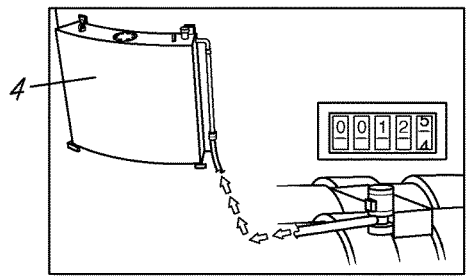
Figure 5G:
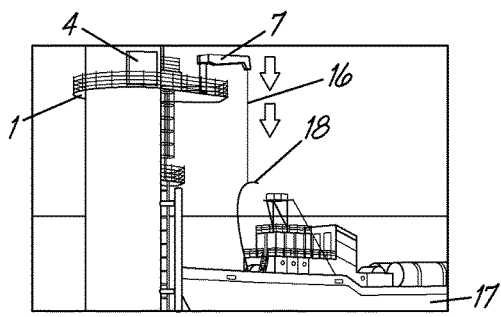
Figure 5H:
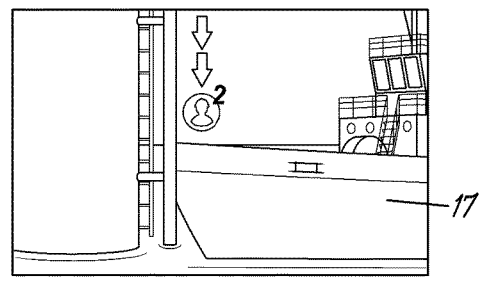

The fuel line 18 is then lowered back on to the sea vessel 17 (FIG. 5(g)), and the service personnel then climb back down the tower and return to the sea vessel 17 (FIG. 5(h)).

Although preferred embodiments of the present invention have been described above, it will be apparent that numerous modifications may be made without departing from the scope of the present invention which is defined by the following claims.

The invention claimed is:

1. A system, comprising:
  a wind turbine generator including a tower and a platform mounted to the tower;
  a housing on the platform including a housing support for supporting equipment within the housing, the housing support including first and second elongate equipment support rails; and
  an apparatus for removing the equipment from the housing on the platform of the wind turbine generator, the apparatus comprising:
    a winch for withdrawing the equipment from the housing in a substantially horizontal direction, the winch including a tension line which, prior to removal of the equipment, is arranged to be connected to the equipment, the winch being arranged to drive and gather the tension line thereby to withdraw the equipment from the housing; and a portable support structure arranged to support the equipment during its withdrawal from the housing, wherein the support structure is generally U-shaped with an open end and an opposite closed end, the support structure defined by two elongate slide support rails forming lengthwise legs of the U-shaped support structure and a cross bar forming the closed end of the U-shaped support structure, wherein the elongate slide support rails are respectively aligned with the first and second elongate equipment support rails at the open end to form a substantially continuous surface over which the equipment is arranged to slide.

2. The system as claimed in claim 1, wherein the winch is attached to the support structure.

3. The system as claimed in claim 1, wherein the support structure is arranged to be moved from an inoperative configuration into an operative configuration where it can support the equipment during removal.

4. The system as claimed in claim 1, further comprising a pulley arrangement in which the length of tension line gathered by the winch is substantially greater than the distance by which the equipment is caused to move.

5. The system as claimed in claim 1, wherein the tension line comprises a chain.

6. The system as claimed in claim 1, wherein the winch comprises an electric motor.

7. The system as claimed in claim 1, further comprising a crane arranged in use on the platform and arranged to lift the equipment after removal from the housing from the support structure and to lower the equipment on to an external surface.

8. The system as claimed in claim 1, wherein the elongate slide support rails abut the first and second equipment support rails at the open end.

9. A method, comprising:

providing a wind turbine generator having a tower and a platform mounted to the tower, the wind turbine generator further including a housing on the platform having a housing support for supporting equipment within the housing, the housing support including first and second elongate equipment support rails;

providing an apparatus having a winch and a portable support structure, wherein the support structure is generally U-shaped with an open end and an opposite closed end, the support structure defined by two elongate slide support rails forming lengthwise legs of the U-shaped support structure and a cross bar forming the closed end of the U-shaped support structure;

aligning the two elongate slide support rails at the open end respectively with the two equipment support rails supporting the equipment in the housing to form a substantially continuous surface over which the equipment is arranged to slide;

coupling a tension line from the winch to the equipment in the housing; and actuating the winch so as to remove the equipment from the housing in a substantially horizontal direction by sliding the equipment along the respectively aligned equipment support rails and slide support rails.

10. The method as claimed in claim 9, wherein the equipment is a power pack.

11. The method as claimed in claim 10, wherein there is further provided on the platform a fuel tank for the power pack.

12. The method as claimed in claim 9, further comprising:

providing a crane arranged in use on the platform and arranged to lift the equipment; and using the crane to lift the equipment after removal from the housing from the support structure and to lower the equipment on to a surface of a sea vessel.

13. The method as claimed in claim 9 further comprising abutting the two elongate slide support rails at the open end respectively with the two equipment support rails supporting the equipment in the housing.

\* \* \* \* \*